Aug. 2, 1949.  W. FEINBLOOM  2,477,689

PLASTIC CONTACT LENS FORMING PLIERS

Filed March 4, 1946

INVENTOR
WILLIAM FEINBLOOM
BY
*Abraham S. Greenberg*
ATTORNEY

Patented Aug. 2, 1949

2,477,689

UNITED STATES PATENT OFFICE 2,477,689

PLASTIC CONTACT LENS FORMING PLIERS

William Feinbloom, New York, N. Y.

Application March 4, 1946, Serial No. 651,950

1 Claim. (Cl. 18—19)

My present invention relates to an optical appliance in the form of pliers designed for correcting the form of plastic contact lenses.

Plastic contact lenses have been provided for the eyeball. Such lenses must be accurately fitted to the individual wearer's eyeball. The contact lens, substantially conical in shape, has a thickness which is uniform, and its edge must be smoothly polished so as to be tolerated on the eyeball for relatively long periods of time. It is highly desirable to employ a forming tool correctively to shape predetermined portions of a plastic contact lens. However, such a tool should possess these characteristics or factors. Firstly, it should be especially constructed to conform to the particular geometry of the contact lens. Secondly, the tool should not damage the edge of the lens. Thirdly, the tool should be readily adapted to bend small, medium or large lens areas.

It is one of the important objects of my present invention to provide a plastic contact lens forming pliers having a pair of jaws provided with complementary concave and convex forming surfaces designed in the light of the geometry of the contact lens, whereby selective correction of a lens is readily accomplished.

It is an additional object of my invention to provide a forming tool for plastic contact lenses, wherein the tool is provided with all three of the aforesaid characteristics or factors.

Another important object of my invention is to provide a pair of forming jaws for optical pliers of the type adapted to bend a plastic contact lens by localized application of heat, the jaws being related in such a way that the complementary forming surfaces diverge from the forward edges thereof in a predetermined manner whereby the lens edge is completely safeguarded from damage.

With these objects in view and others, as will appear as the description proceeds, the invention comprises the various novel features of construction and arrangement of parts which will be fully described hereinafter and set forth with particularity in the appended claim.

Figure 1:
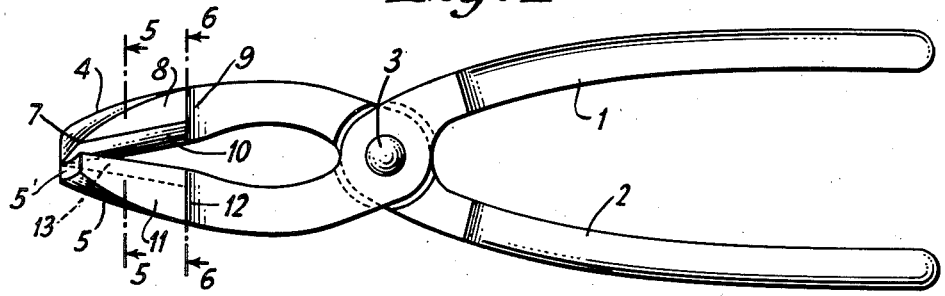
Fig. 1 is a side view of the contact lens forming pliers in closed position.

Referring now to the drawing, wherein similar reference characters are employed to designate corresponding parts throughout the various views, I have shown in Fig. 1 my forming tool, which is a pair of pliers having handles 1 and 2 pivotally connected at 3 and provided with jaws 4 and 5. The jaws 4 and 5 are respective extensions of handles 2 and 1. The jaw elements 5 and 4 are preferably made of any metallic material adapted to absorb and store heat, and are respectively concave and convex on the opposed inner forming faces thereof.

Figure 2:
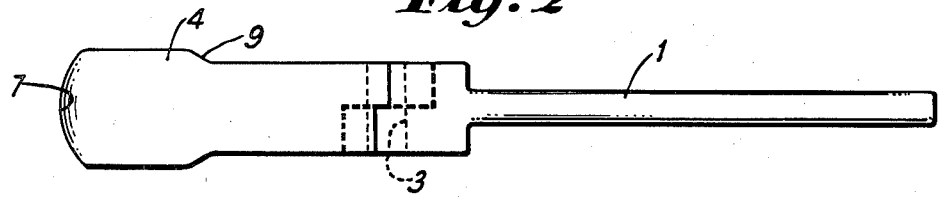
Fig. 2 is a plan view of the pliers.
Figure 3:
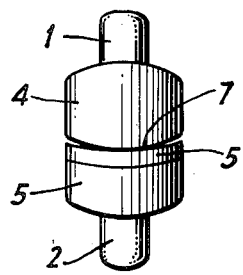
Fig. 3 is a front view of the plier jaws in the closed position shown in Fig. 1.
Figure 5:
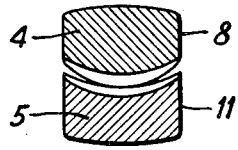
Fig. 5 is a section on line 5—5 of Fig. 1 looking in the direction of the arrows.
Figure 6:
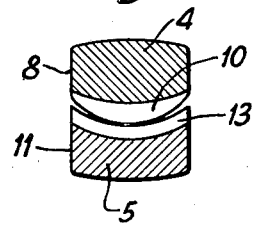
Fig. 6 is a section on line 6—6 of Fig. 1 looking in the direction of the arrows.

In Fig. 3, which is a front view of the jaws of the pliers, I have shown the geometric relation between the jaws 4 and 5 in the closed position of the pliers. The jaw 4 has a generally convex upper face, while its front edge 7 has a uniform curvature. The side faces 8 of the jaw are parallel, but the rear half of the jaw is reduced as depicted in Fig. 2. The lower face of jaw 4 has a convex configuration, as depicted in Figs. 5 and 6. This convexity 10 extends from the curved front edge 7 to rear reduced section 9.

The complementary jaw 5 has dimensions generally similar to those of jaw 4. The forward side faces 11 of the jaw 5 are plane and parallel, while the rear section 12 is reduced in the manner indicated for jaw 4 in Fig. 2. The forming or upper face 13 of jaw 5 is concave along its length from lip 5' to reduced section 12. The lip 5' of jaw 5 possesses curvature precisely in the same manner as front edge 7 of jaw 4. This is clearly depicted in the plan view of Fig. 2. The front edge 7 and upper edge of lip 5' contact at a median point, as shown in Fig. 3.

In accordance with one aspect of my invention, therefore, there is provided a pair of forming jaws whose complementary forming faces are respectively concave and convex. The jaws are so spaced that the forming surfaces generally differ in radii by the approximate thickness of the plastic contact lens to be operated on. In other words, the radius of curvature for the concave and convex curves is a very close approximation to the average radius of curvature of the contact lenses to be worked on. Merely by way of example, the radius of curvature of convex surface 10 may be 0.470 inch, while the radius of curvature of concave surface 13 may be 0.510 inch.

In accordance with a second aspect of my invention, the forming surfaces 10 and 13 are related in a rearwardly divergent manner. The jaws are set in such a manner that the surfaces 10 and 13 diverge as they recede from the front median contact point. This is shown clearly in Fig. 1, but in an exaggerated manner.

While I prefer to provide the median contact between edge 7 and lip 5' in closed position, yet it is possible to have the apex or forward spacing at about 0.020 inch when the pliers are closed.

The rate of divergence or taper, is preferably of the order of 2 degrees in closed position. The spacing between surfaces 10 and 13 is about 0.040 inch at section line 5 of Fig. 1, and at section line 6—6 in Fig. 1 the surfaces are assumed to be spaced about 0.080 inch apart. In other words the spacing in Fig. 6 between the convex and concave surfaces 10 and 13 is about double that in Fig. 5. Further, I prefer that when the jaws are opened to about 0.045 inch on either side of the jaws, that the jaws should be parallel.

It will now be appreciated that the jaws are geometrically related so that the inner forming surfaces thereof are rearwardly divergent from a forward, or apex, point, and that the rate of divergence or taper, is predetermined. It is pointed out that the thickness of the plastic contact lens material is between 0.030 and 0.040 inch thick. Obviously, the rearward divergence of the jaws is so chosen that there will be covered the largest length of plastic lens to be bent or formed. It is to be understood that the physical relations specified are dependent upon the curvature and thickness of the contact lenses to be corrected. I do not wish to be restricted to the specific illustration given herein.

Figure 4:
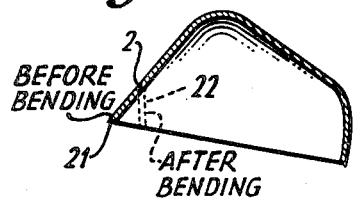
Fig. 4 is a median vertical section through a plastic conical contact lens.

In Fig. 4 there is shown an illustrative form of conical contact lens made of a suitable plastic material. The figure is a median longitudinal section through a contact lens 20. Usually this type of lens is shaped as shown. The peripheral edge 21 is ground and polished prior to fitting the lens to the eyeball. During the fitting it is essential that the contact lens accurately conform to the eyeball in order to secure the desired benefit. Hence, it is often necessary to form, or bend, selective portions of the lens to secure an accurate fit. My pliers permit such forming, or bending, to be performed without fear of damage to the polished edge 21.

In accordance with a third aspect of my invention, the forward, or apex, faces of the jaws are given a predetermined radius of curvature in order to prevent so-called "square" edges at bend point. While not restrictive, I prefer a radius of curvature of 0.625 inch for the forward edge 7 and lip 5', particular reference being made to the plan view of Fig. 2 for the curvature preferred. Such curvature allows for small, medium or large area bending. If the front ends of the jaws were flat across, then one could not make different area bends without leaving "square" edges at the bends through which leakage would occur with consequent air bubble formation.

To bend a portion of the lens 20 into the dotted position 22 at point 23, it is only necessary to place the jaws 4 and 5 in boiling water to store up adequate heat in the jaws. The pliers handles are then held in one hand and opened thereby opening jaws 4 and 5. The portion of the lens to be bent is placed between jaws 4 and 5. The apex spacing is located at the desired point of bending 23, and the handles adjusted to close the pliers. The heated jaw surfaces at point 23 will heat the plastic and soften it sufficiently to permit the displacement to position 22. Since the surfaces 10 and 13 are rearwardly divergent, the edge 21 is not engaged by the jaws. Hence, the bend has taken place inside, or away, from edge 21. There is thus avoided any damage to the edge, and the polished condition thereof is not impaired. For large area bending, it is pointed out, the plastic material is inserted between the jaws up to a line joining the ends of the curvature 7 of Fig. 2.

If the two surfaces 10 and 13 were not divergent, the plastic would inevitably be heated over the region extending from the edge 21 to point 23. Consequently the edge 21 would become distorted and warped, for the heat would always be in excess at this point. The result would be that the edge 21 would have to be reground and polished to make it bearable to the eyeball. Accordingly, the divergence of the forming surface 10 and 13 is important to the proper functioning of the pliers. It is, furthermore, to be noted that the lateral configuration of surfaces 10 and 13 is a very close approximation to the average curvature of the conical contact lens. This prevents deformation of the lens curvature.

Figure 7:
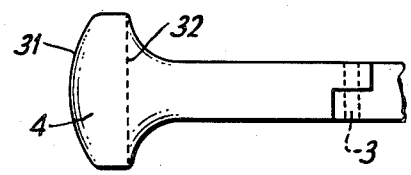
Fig. 7 is a plan view of a modification.
Figure 8:
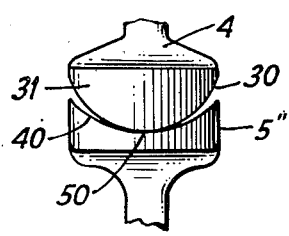
Fig. 8 is a front view of the jaws of the modified pliers.

In Figs. 7 and 8 I have shown a modification of the pliers wherein the weight of the tool is decreased by confining the forming surfaces of the jaws to a relatively restricted portion of the jaws. Thus, the convex surface 30 of jaw 4' extends from the curved face 31 to the relatively closely spaced edge 32. The jaw 4' is considerably reduced to the rear of line 32. Hence, the space between the jaws and pivot 3 is far greater than in the case of Fig. 1. This makes for a light tool. The jaw 5" has its forming surface 40 concave as shown in Fig. 8. Here, again, the forward face of jaw 5" is curved. The radius of curvature is the same for both jaws 4' and 5", and is shown in Fig. 7 in plan view. The concave surface 40 extends rearwardly to line 32. As in Fig. 1, the forming surfaces are divergent from front contact point to line 32. For large area bending the edge 21 of a lens will extend substantially to line 32.

As various possible embodiments might be made of my above invention, and as various changes might be made in the embodiment set forth above, it is to be understood that all matter herein set forth or shown in the accompanying drawing is to be interpreted as illustrative and not in a limiting sense.

What I claim is:

In pliers adapted for bending a selected portion of a plastic contact lens, a pair of pivoted handles each provided with a respective jaw, said jaws having complementary inner forming surfaces which contact at the apex thereof, said surfaces being rearwardly divergent from said contact apex in accordance with a predetermined taper thereby to provide said bend at said apex without damage to the polished edge of said lens located between the divergent surfaces, said inner forming surfaces being respectively transversely concave and convex, said apex having a predetermined radius of curvature, and the contact at said apex being located at a median point thereof to provide transverse divergence of the jaws on either side of the median contact point.

WILLIAM FEINBLOOM.

REFERENCES CITED

The following references are of record in the file of this patent:

UNITED STATES PATENTS

| Number | Name | Date |
| --- | --- | --- |
| 415,960 | Coe | Nov. 26, 1889 |
| 448,133 | Cushing | Mar. 10, 1891 |
| 586,770 | Kempshall | July 20, 1897 |
| 1,177,177 | Feix | Mar. 28, 1916 |
| 1,294,689 | Mellum | Feb. 18, 1919 |
| 1,674,485 | Smith | June 19, 1928 |
| 2,253,906 | Lehman | Aug. 26, 1941 |